United States Patent [19]
Yusuki et al.

[11] Patent Number: 5,793,949
[45] Date of Patent: Aug. 11, 1998

[54] INFORMATION PROCESSING UNIT, DEVICE AND METHOD

[75] Inventors: Kenichi Yusuki; Kenji Hoshi; Kiyoshi Sudo; Takatoshi Kato, all of Kawasaki, Japan

[73] Assignee: Fujitsu Limited, Kawasaki, Japan

[21] Appl. No.: 623,681

[22] Filed: Mar. 29, 1996

[30] Foreign Application Priority Data

Mar. 31, 1995 [JP] Japan ................. 7-076759

[51] Int. Cl.⁶ ............................................. G06F 11/00
[52] U.S. Cl. ............................................. 395/185.01
[58] Field of Search ................. 395/185.01, 185.1, 395/185.02, 185.05, 182.16, 182.13, 872, 873, 874, 852, 853; 371/32, 33

[56] References Cited

U.S. PATENT DOCUMENTS

| | | | |
|---|---|---|---|
| 3,676,846 | 7/1972 | Busch | 371/33 |
| 4,082,922 | 4/1978 | Chu | 371/33 |
| 4,352,103 | 9/1982 | Slater | 371/33 |
| 4,621,323 | 11/1986 | Mayhew | 395/182.16 |
| 4,803,685 | 2/1989 | Oget | 371/33 |
| 5,077,742 | 12/1991 | Tsumura et al. | 371/32 |
| 5,119,379 | 6/1992 | Dara | 371/29.1 |
| 5,153,884 | 10/1992 | Lucak et al. | 371/32 |
| 5,163,055 | 11/1992 | Lee et al. | 371/33 |
| 5,163,151 | 11/1992 | Bronikowski et al. | 395/725 |
| 5,423,025 | 6/1995 | Goldman et al. | 395/185.1 |
| 5,481,535 | 1/1996 | Hershey | 371/33 |
| 5,555,372 | 9/1996 | Tetreault et al. | 395/182.13 |
| 5,557,744 | 9/1996 | Kobayakawa et al. | 395/200.01 |

*Primary Examiner*—Robert W. Beausoliel, Jr.
*Assistant Examiner*—Joseph E. Palys
*Attorney, Agent, or Firm*—Staas & Halsey

[57] ABSTRACT

There is provided an information processing device having information processing units between which data can be transferred via a bus provided therebetween. A data requested unit which is one of the information processing units sends an answering signal to a data requesting unit which is another one thereof. The information processing device includes an error detecting part for detecting an error in received data, an answering signal generating part for generating an error answering signal with respect to received data having an error and a normality answering signal with respect to received data having no error, and an information sending part for sending the error answering signal to the bus with priority over the normality answering signal.

13 Claims, 16 Drawing Sheets

INFORMATION PROCESSING UNIT, DEVICE AND METHOD

BACKGROUND OF THE INVENTION

1. Field of the Invention

The present invention generally relates to an information processing device and method, and more particularly an information processing method and device in which information is transferred through a common bus connecting information processing units together and an answer signal is sent to an information transmitting unit from an information receiving unit upon receiving the transferred information.

2. Description of the Related Art

The processing capability of recent information processing devices greatly relates to a bus transfer capability. It is attempted to employ an increased number of bits forming the bus and a shorter bus cycle in order to improve the processing capability of the information processing devices. Recently, there has been considerable activity in the development of arranging the bus in a packet formation (packet bus).

Such a packet bus differs from conventional buses as follows. In the conventional bus, a data requesting unit or module (master) accesses a data requested unit or module while the data requesting unit is exclusively using the bus until the data requested unit sends requested data to the data requesting unit. This process depends on the response speed of the data requested unit. While the data requesting unit is exclusively using the bus, another data requesting unit is not permitted to use the bus. In the packet bus, the data requesting unit exclusively uses the bus for limited periods only. More particularly, the bus is exclusively used by the data requesting unit only during the time when the data requesting unit sends a data request packet to the data requested unit and during the time when the data requesting unit receives requested data therefrom. Thus, another data requesting unit can use the bus during an idle period between the time when the data requesting unit sends the data request packet to the data requested unit and the time when the data requesting unit receives the requested data from the data requested unit. The above process is independent of the response speed of the data requested unit. Hence, the bus can be efficiently utilized so that data can be transferred very efficiently.

The above packet bus has a problem to be solved. If a larger number of data requesting units send data request packets to a data requested unit, this data requested unit receives the many data request packets and processes the requests serially in the order of receiving the requests. That is, the data requested unit may have a large number of data request packets at one time. If a data request packet has an error, it is desired that the data requesting unit sending the data request packet having the error be informed of the occurrence of the error as soon as possible. Then, an appropriate process for eliminating the error may be carried out in a recovery or maintenance work for the data requesting unit.

However, the data requested unit processes the data requests one by one in the order of receipt thereof, and therefore it may take a long time to inform the data requesting unit sending the request having the error of the occurrence of the error. In other words, all requests which are received prior to the request having the error are processed and then the request having the error is processed. In this case, there is a delay in performing the process for eliminating the error, and, thus, the information processing device is not reliable.

SUMMARY OF THE INVENTION

It is a general object of the present invention to provide an information processing method, unit and device in which the above disadvantage is eliminated.

A more specific object of the present invention is to provide an information processing method, unit and device in which, when an error occurs, an appropriate process for coping with the error can be performed immediately.

The above objects of the present invention are achieved by an information processing method for information processing units between which data can be transferred via a bus provided therebetween, a data requested unit which is one of the information processing units sending an answering signal to a data requesting unit which is another one thereof, the information processing method comprising the steps of:

(a) detecting an error in received data;

(b) generating an error answering signal with respect to received data having an error and a normality answering signal with respect to received data having no error; and (c) sending the error answering signal to the bus with priority over the normality answering signal.

According to the above method, the error answering signal is sent to the data requesting unit via the bus in advance of the normality answering signal, so that the data requesting unit can be informed of the occurrence of the error immediately.

The above objects of the present invention are also achieved by an information processing unit which takes place a data transfer with another information processing unit via a bus provided therebetween, a data requested unit which is one of information processing units sending an answering signal to a data requesting unit which is another one thereof, the information processing unit comprising:

error detecting means for detecting an error in received data;

answering signal generating means for generating an error answering signal with respect to received data having an error and a normality answering signal with respect to received data having no error; and information sending means for sending the error answering signal to the bus with priority over the normality answering signal.

According to the above unit, the error answering signal is sent to the data requesting unit via the bus in advance of the normality answering signal, so that the data requesting unit can be informed of the occurrence of the error immediately.

In the above unit, the information sending means may comprise memory means for storing at least one error answering signal and normality answering signals, and control means for controlling the memory means so that the error answering signal is read from the memory means and sent to the bus in advance of the normality answering signals stored in the memory means.

In the above unit, the memory means may store the error and normality answering signals in the order of receipt thereof, and the control means may control the memory means so that the normality answering signals are sequentially read from the memory means in the order of receipt thereof when no error answering signal is stored in the memory means, and further if there is the error answering signal in the memory means, the error answering signal is sent to the bus in advance of the normality answering signals.

In the above unit, the memory means may comprise a first memory which stores the normality answering signals and a second memory which stores the error answering signal, and the control means may control the memory means so that if there is at least one error answering signal in the second memory, the error answering signal is sent to the bus in advance of the normality answering signals.

In the above unit, the answering signal generating means may comprise means for adding identification information to a respective set of received data, the identification information indicating whether the respective set of the received data has an error, the identification information being stored in the memory means together with the respective set of the received data. Further, the control means may control the memory means so that if there is the identification information indicating that there is received data having an error, the error answering signal is sent to the bus in advance of the normality answering signals. According to the above unit, it is possible to make a decision as to whether the received data has an error by referring to the identification information stored in the memory means, so that the data requesting unit can be informed of the occurrence of the error immediately.

The above unit may comprise memory means for storing received data obtained via the bus. In this case, the answering signal generating means may comprise first means for generating the error answering signal with respect to received data having an error detected by the error detecting means, and second means for generating the normality answering signal with respect to received data having no error. Hence, the error answering signal can be generated immediately after an error contained therein is detected.

The above unit may comprise memory means for storing received data obtained via the bus. In this case, the error detecting means may comprise means for adding identification information to a respective set of the received data, the identification information discriminating received data having an error from received data having no error, the identification information being stored in the memory means together with the respective set of the received data. Further, the answering signal generating means may comprise means for generating, while referring to the identification information in the order of reading the received data, the error answering information with respect to the identification information indicating an error and the normality answering information with respect to the identification information indicating no error. Furthermore, the information sending means may comprise means for reading, from the memory means, the received data to which the identification information indicating an error is added in advance of the received data to which the identification information indicating no error is added, and for supplying read data from the memory means to the answering signal generating means, so that the error answering signal is sent to the bus in advance of the normality answering signals, which are then sent to the bus in the order of generation thereof. According to the above, the error answering signal can be read from the memory means with priority over the normality answering signals, so that the data requesting unit can be informed of the occurrence of the error immediately.

The above unit may comprise a first memory which stores received data having an error detected by the error detecting means, and a second memory which stores received data having no error. In this case, the answering signal generating means may generate answering signals with respect to the received data read from the first and second memories in the order of reading the received data therefrom. The information sending means may comprise means for reading the received data from the first memory in advance of the received data stored in the second memory, and for supplying read data from the first and second memories to the answering signal generating means, so that the error answering signal is sent to the bus in advance of the normality answering signals, which are then sent to the bus in the order of generation thereof. According to the above, received data having an error and received data having no error are separately stored in the first and second memories, so that the error answering signal can be read from the first memory immediately and thus the data requesting unit can be informed of the occurrence of the error.

The above-mentioned objects of the present invention are also achieved by an information processing device having information processing units between which data can be transferred via a bus provided therebetween, a data requested unit which is one of the information processing units sending an answering signal to a data requesting unit which is another one thereof, the information processing device comprising:

error detecting means for detecting an error in received data;

answering signal generating means for generating an error answering signal with respect to received data having an error and a normality answering signal with respect to received data having no error; and information sending means for sending the error answering signal to the bus with priority over the normality answering signal.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 1:
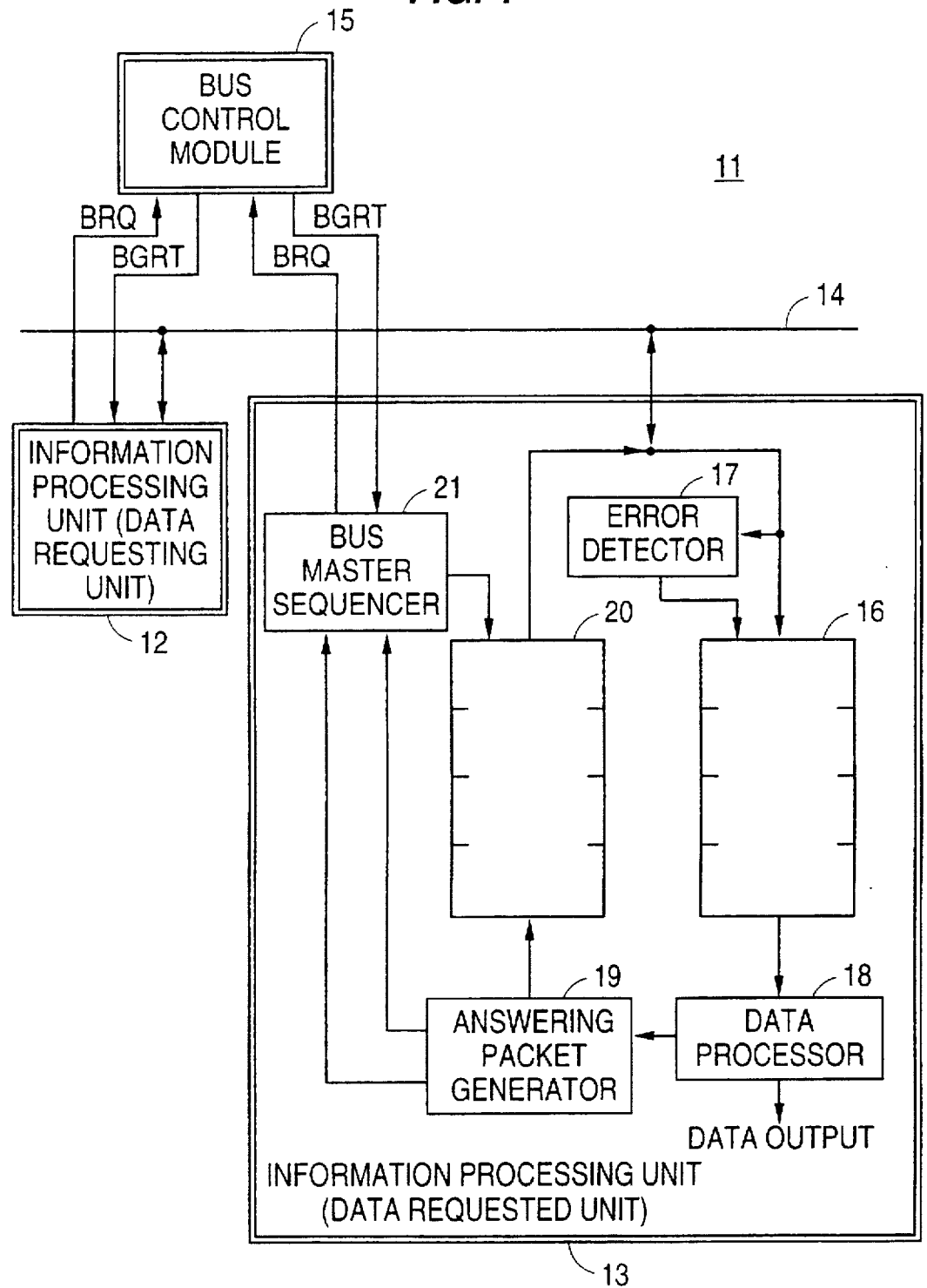
FIG. 1 is a block diagram of an information processing device according to a first embodiment of the present invention.

FIG. 1 is a block diagram of an information processing device 11 according to a first embodiment of the present invention. The information processing device 11 has information processing units (modules) connected to a common bus through which data is transferred in packet formation (a set of data).

More particularly, the information processing device (which may be referred to as a information processing device) 11 includes information processing units 12 and 13 such as computers, a packet bus 14 and a bus control module 15. The units 12 and 13 are connected together through the packet bus 14. The information processing units 12 and 13 process data in accordance with respective built-in programs. Packet data is transferred between the units 12 and 13 via the packet bus 14. The bus control module 15 receives requests to send packets from the units 12 and 13 and controls the packet bus on the basis of the received requests.

In the following description, the information processing unit 12 serves as a data requesting unit, and the information processing unit 13 serves as a data requested unit. That is, the unit 12 requests the unit 13 to send data, and the unit 13 sends answer information to the unit 12 upon receiving the request.

When the unit 12 performs a process and then needs data stored in the unit 13, the unit 12 generates data in packet format in which information indicative of necessary data and identification of the unit 13 are included. Then, the unit 12 sends the bus control module 15 a bus request signal BRQ.

In response to the bus request signal BRQ from the unit 12, the bus control module 15 checks the status of the packet bus 14, and sequentially permits the units to use the packet bus 14 one by one in the order of receiving the bus request signals. When the unit 12 is in its turn, the module 15 provides the unit 12 with a bus grant signal BGRT which allows the unit 12 to exclusively use the packet bus 14.

The unit 12 receives the bus grant signal BGRT from the module 15, and then sends the data generated in the above-mentioned way to the packet bus 14. The unit 13 analyzes the received data and determines whether the received data is addressed to the unit 13. When the result of the above determination is affirmative, the unit 13 inputs the data and sends answer data to the unit 12 in the same way as the unit 12 as described above. In this way, the unit 13 responds to the unit 12.

As shown in FIG. 1, the unit 13, which may have the same configuration as the unit 12, is made up of a receive buffer 16, an error detector 17, a data processor 18, an answering packet generator 19, an answer buffer 20 and a bus master sequencer 21. The receive buffer 16 stores data addressed to the unit 13 and received through the packet bus 14. The error detector 17 performs a parity error check by using predetermined bits contained in the data addressed to the unit 13. If an error is detected, the error detector 17 informs the receive buffer 16 of the presence of the error. The data processor 18 reads data from the receive buffer 16 in the order of receiving the data, and processes the data in accordance with a program stored in the data processor 18. The result of the above data process can be output to a device located outside of the information processing unit 13 or a unit (not shown) built in the unit 13. The answering packet generator 19 adds information indicative of the destination unit to the data obtained by the process of the data processor 18, and generates answer data in packet format (answering packets).

The answer buffer 20 stores the answering packets generated by the answering packet generator 19 in the order of generation of the answering packets. The bus master sequencer 21 sends the bus request signal BRQ in response to an error/normality answering packet from the answering packet generator 19. Further, the bus master sequencer 21 performs a control in response to the bus grant signal BGRT so that the error answering packet sent by the answering packet generator 19 is sent to the packet bus 14 in advance of all the normality answering packets.

Figure 2:
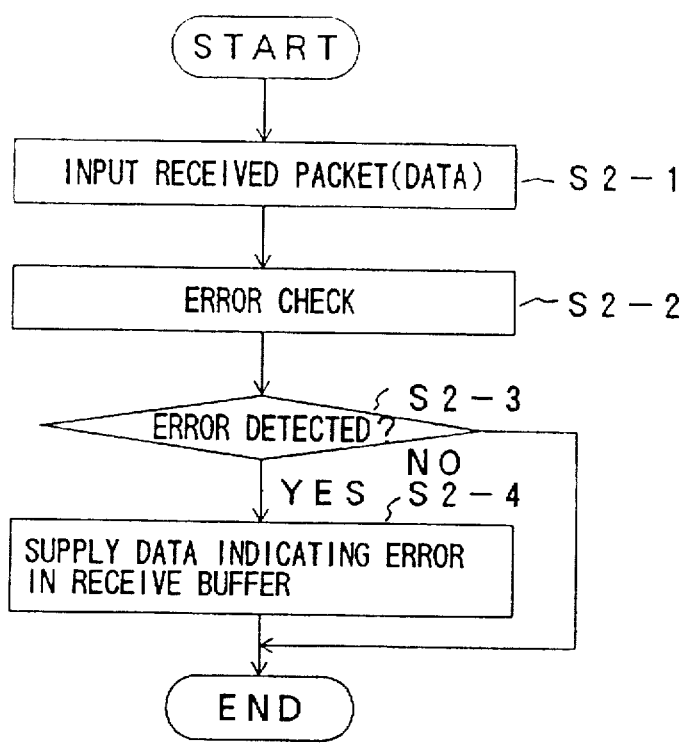
FIG. 2 is a flowchart of an operation of an error detector used in the first embodiment of the present invention.

FIG. 2 is a flowchart of the operation of the error detector 17. The error detector 17 inputs a received packet (data), and performs a parity error check of the received packet at steps S2-1 and S2-2. Next, the error detector 17 determines whether an error is detected at step S2-3. If an error is detected at step S2-3, the error detector 17 sends data indicating the occurrence of the error to the receive buffer 16, so that the above data is added to the received packet in the receive buffer 16 at steps S2-3 and S2-4. If an error is not detected by step S2-3, the data indicating the occurrence of an error is not output, and the received packet is stored in the receive buffer 16 as is.

The data processor 18, which is connected to the receive buffer 16, inputs the data from the receive buffer 16. Then, the data processor 18 processes the input data in accordance with a predetermined program built therein, and supplies the result of the above data process to the answering packet generator 19.

Figure 3:
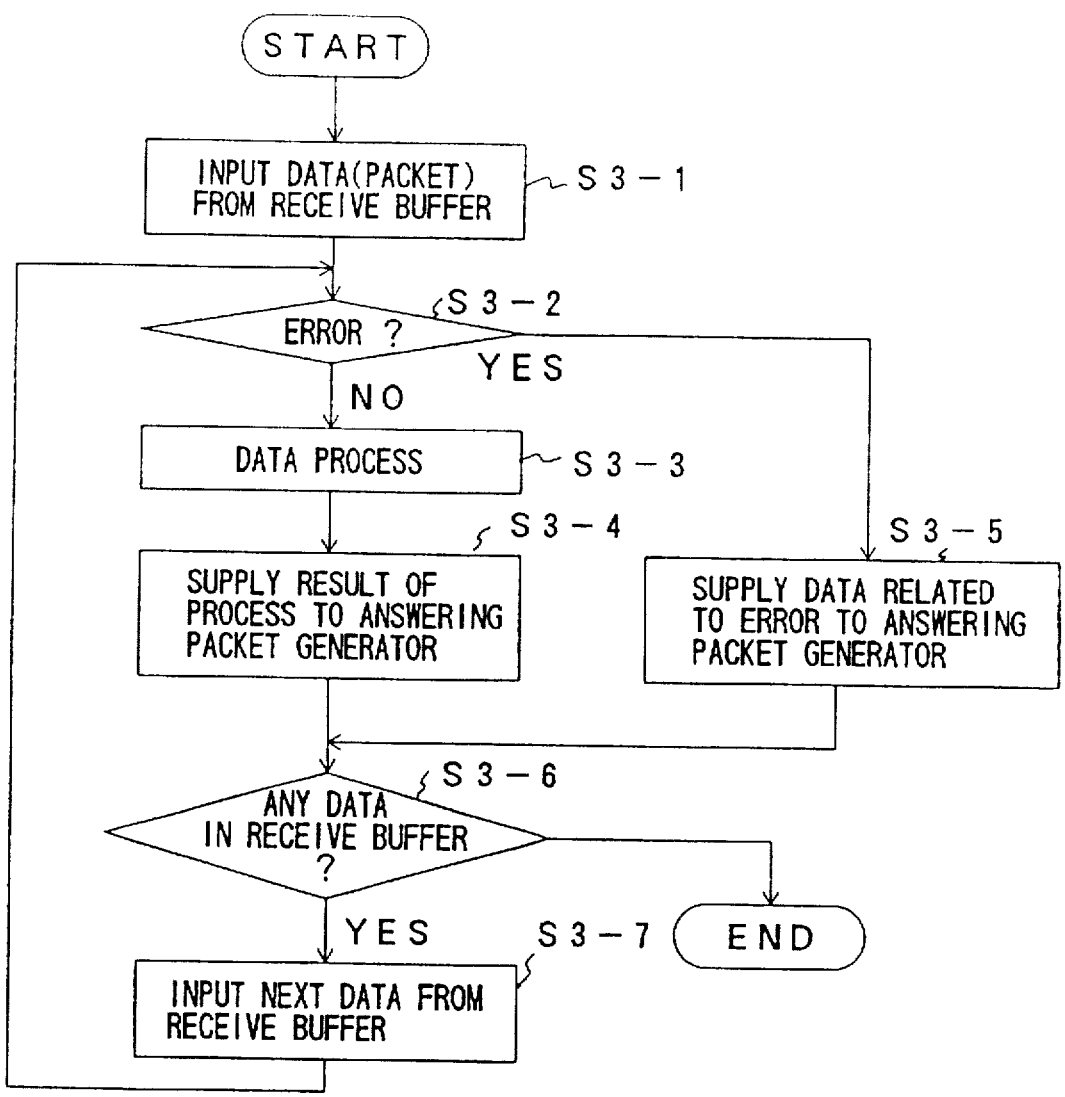
FIG. 3 is a flowchart of an operation of a data processor used in the first embodiment of the present invention.

FIG. 3 is a flowchart of the operation of the data processor 18. The data processor 18 takes the first packet among the packets stored in the receive buffer 16 at step S3-1. Next, the data processor 18 determines, at step S3-2, whether the packet has an error by checking whether there is the data added to the packet at step S2-4. If it is determined that there is no error, the data processor 18 analyzes the packet in accordance with a program built therein (that is, a data process) at step S3-3. Then, the data processor 18 sends the result of the above data process to the answering packet generator 19 at step S3-4. If it is determined at step S3-2 that the packet has an error, the data processor 18 sends data corresponding to the error to the answering packet generator 19 at step S3-5.

At step S3-6, the data processor 18 refers to the receive buffer 16, and makes a decision as to whether there is data (a packet) in the receive packet 16. If there are any packets in the receive buffer 16, the data processor 18 reads the next packet (received data) from the receive buffer 16. Steps S3-2 through S3-7 are repeatedly carried out so that the packets stored in the receive buffer 16 are sequentially processed one by one.

When the answering packet generator 19 receives the normal data (having no error) from the data processor 18, it generates the normality answering packet. When the answering packet generator 19 receives the data indicating the occurrence of an error, it generates the error answering packet. The normality and error answering packets are sequentially stored in the answer buffer 20 in the order of receipt thereof.

Figure 4:
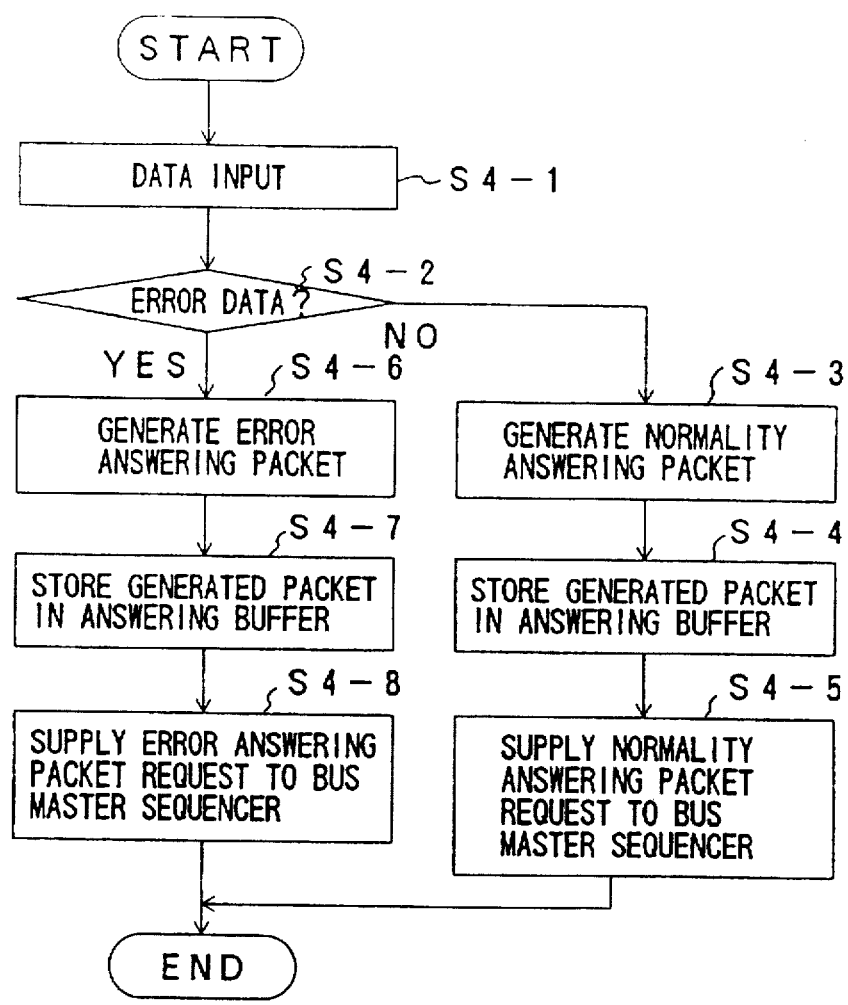
FIG. 4 is a flowchart of an operation of an answering packet generator used in the first embodiment of the present invention.

FIG. 4 is a flowchart of the answering packet generator 19. The answering packet generator 19 receives the result of the process by the data processor 18 at step S4-1, and determines whether the received data is the normal data or the data indicating the occurrence of an error at step S4-2. If the received data is normal, the answering packet generator 19 generates the normality answering packet at step S4-3, and stores it in the answer buffer 20 at step S4-4. Then, the answering packet generator 19 switches the normality answering packet request to a high level at step S4-5. The high-level normality answering packet request is then supplied to the bus master sequencer 21. If the result of step S4-2 indicates that the data read from the receive buffer 16 has an error, the answering packet generator 19 generates the error answering packet at step S4-6, and stores it in the answer buffer 20 at step S4-7. Then, the answering packet generator 19 switches the error answering packet request to a high level at step S4-8. The packets thus generated by the answering packet generator 19 are sequentially stored in the answer buffer 20 in the order of receipt thereof.

Figure 5:
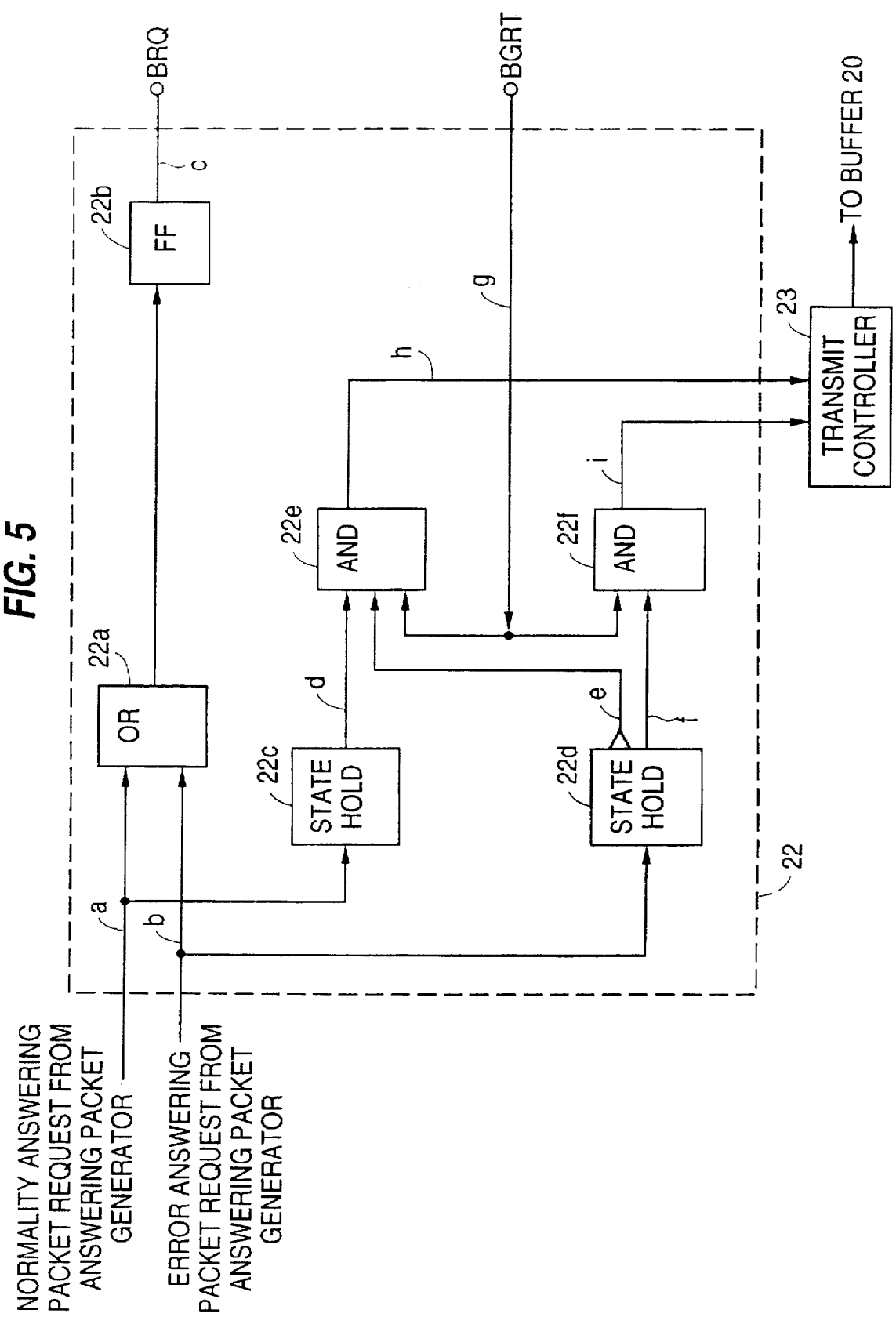
FIG. 5 is a block diagram of a bus master sequencer used in the first embodiment of the present invention.

FIG. 5 is a block diagram of the bus master sequencer 21 shown in FIG. 1. The bus master sequencer 21 is made up of a transmit operation starting signal generator 22, and a transmit controller 23. The transmit operation starting signal generator 22 generates a transmit operation starting signal. The transmit controller 23 controls the read operation on the answer buffer 20 in response to the transmit operation starting signal generated by the generator 22.

The transmit operation starting signal generator 22 is supplied, from the answering packet generator 19, with the normality answering packet which is switched to the high level when it is determined that the data has no error, and the error answering packet which is switched to the high level when it is determined that the data has an error. The sequencer 21 sends the bus request signal BRQ to the bus control module 15, based on the normality answering packet request or the error answering packet request. The sequencer 21 is supplied with the bus grant signal BGRT from the bus control module 15. The sequencer 21 generates, in response to the bus grant signal BGRT, a normality answering packet transmit operation starting signal which is switched to the high level at the time of transmitting the normality answering packet. The sequencer 21 generates, in response to the bus grant signal BGRT, an error answering packet transmit operation starting signal which is switched to the high level at the time of transmitting the error answering packet.

The transmit operation starting signal generator 22 is comprised of an OR gate 22a, a flip-flop (FF) 22b, state hold circuits 22c and 22d, and AND gates 22e and 22f. The OR gate 22a is supplied, from the answering packet generator 19, with the normality answering packet request and the error answering packet request, and performs an OR operation thereon. The flip-flop 22b holds the result of the above OR operation obtained by the OR gate 22a until the packet is transmitted. The output signal of the flip-flop 22b serves as the bus request signal BRQ. The state hold circuit 22c, supplied with the normality answering packet request, holds the state (high or low) of the normality answering packet request when the bus grant signal BGRT is switched to the high level. The state hold circuit 22d, supplied with the error answering packet request, holds the state (high or low) of the error answering packet request when the bus grant signal BGRT is switched to the high level. The AND gate 22e is supplied with the hold signal supplied from the state hold circuit 22c, the inverted version of the state hold circuit 22d, and the bus grant signal BGRT, and performs an AND operation thereon. The AND gate 22f is supplied with the hold signal of the state hold circuit 22d and the bus grant signal BGRT, and performs an AND operation thereon.

The transmit operation starting signal generator 22 supplies the bus control module 15 with the bus request signal BRQ by means of the OR gate 22a and the flip-flop 22b when either the normality answering packet request or the error answering packet request is switched to the high level. In this way, the use of the packet bus 14 is requested. When the generator 22 is supplied with the bus grant request BGRT from the bus control module 15, the generator 22 generates either the normality answering packet transmit operation starting signal or the error answering packet transmit operation starting signal on the basis of the normality answering packet request or the error answering packet request.

Figure 6:
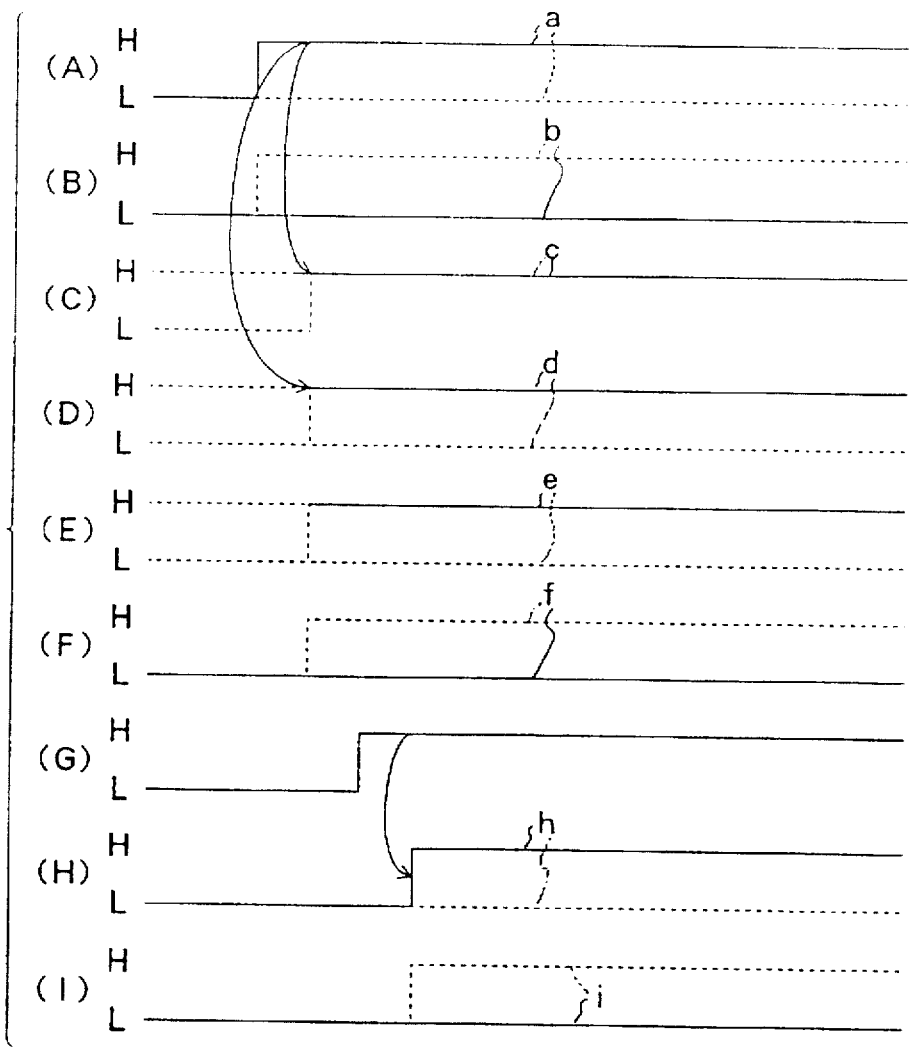
FIG. 6 is a time chart of an operation of the bus master sequencer shown in FIG. 5.

FIG. 6 is a time chart of the operation of the transmit operation starting signal generator 22 of the bus master sequencer 21. Part (A) of FIG. 6 shows the normality answering packet request now labeled "a", and Part (B) thereof shows the error answering packet request "b". Part (C) of FIG. 6 shows the bus request signal BRQ ("c"), and part (D) thereof shows the hold signal "d" output by the state hold circuit 22c. Part (E) of FIG. 6 shows the inverted version "e" of the hold signal of the state hold circuit 22d, and part (F) thereof shows the hold signal output by the state hold circuit 22d. Part (G) of FIG. 6 shows the bus grant signal BGRT ("g") from the bus control module 15, and part (H) thereof shows the normality answering packet transmit operation starting signal "h". Part (I) of FIG. 6 shows the error answering packet transmit operation starting signal "i".

In FIG. 6, the solid lines show the waveforms of the above signals observed when the normality answering packet request is switched to the high level, and the broken lines show waveforms thereof observed when the error answering packet request is switched to the high level.

As indicated by the solid lines, when the normality answering packet request "a" is switched to the high level, the normality answering packet transmit operation starting signal "h" is high (H) and the error answering packet transmit operation starting signal "i" is low (L). As indicated by the broken lines, when the error answering packet request "b" is switched to the high level, the normality answering packet transmit operation starting signal "h" is low and the error answering packet transmit operation starting signal "i" is high.

Further, when the normality answering packet request "a" is switched to the high level, the bus request signal BRQ is switched to the high level. In the case where the bus grant signal BGRT is at the low level (waiting for the permission of use of the bus 14) and the error answering packet request is generated (switched to the high level), the error answering packet transmit operation starting signal "i" is switched to the high level, so that the error answering packet is instructed to be sent.

The signals generated by the transmit operation starting signal generator 22 are supplied to the transmit controller 23 shown in FIG. 5.

The transmit controller 23 retrieves from the answer buffer 20 the normality answering packet to be next transmitted when the normality answering packet transmit operation starting signal "h" is high, and retrieves from the answer buffer 20 the error answering packet to be transmitted in advance of the normality answering packets when the error answering packet transmit operation starting signal "i" is high.

Figure 7:
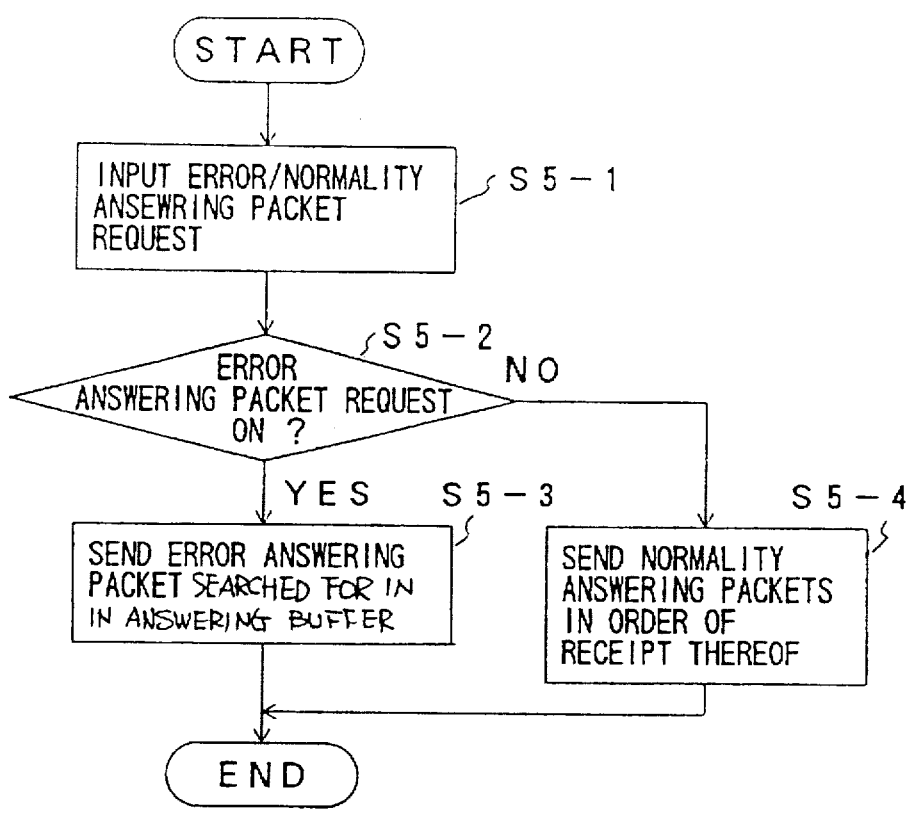
FIG. 7 is a flowchart of a transmit controller used in the first embodiment of the present invention.

FIG. 7 is a flowchart of the transmit controller 23 shown in FIG. 5. The transmit controller 23 inputs the transmit operation starting signal at step S5-1, and determines whether the error answering packet request is high at step S5-2. When it is determined at step S5-2 that the error answering packet request is valid, the transmit controller 23 searches for the error answering packet to be transmitted in advance of the normality answering packets and sends it to the packet bus 14 at step S5-3. When it is determined at step S5-2 that the normality answering packet request is valid, the transmit controller 23 sends the next normality answering packet in the answer buffer 20 at step S5-4.

According to the above-mentioned first embodiment of the present invention, the error answering packet stored in the answer buffer 20 is obtained and transmitted when the error answering packet is generated, and the normality answering packet stored therein to be next transmitted is searched for and is then transmitted when the normality answering packet is generated. Hence, the information processing unit 12 which functions as the data requesting unit can be informed of the occurrence of an error immediately. Hence, it becomes possible to immediately cope with the error and to hence improve the reliability of the information processing device 11.

Figure 8:
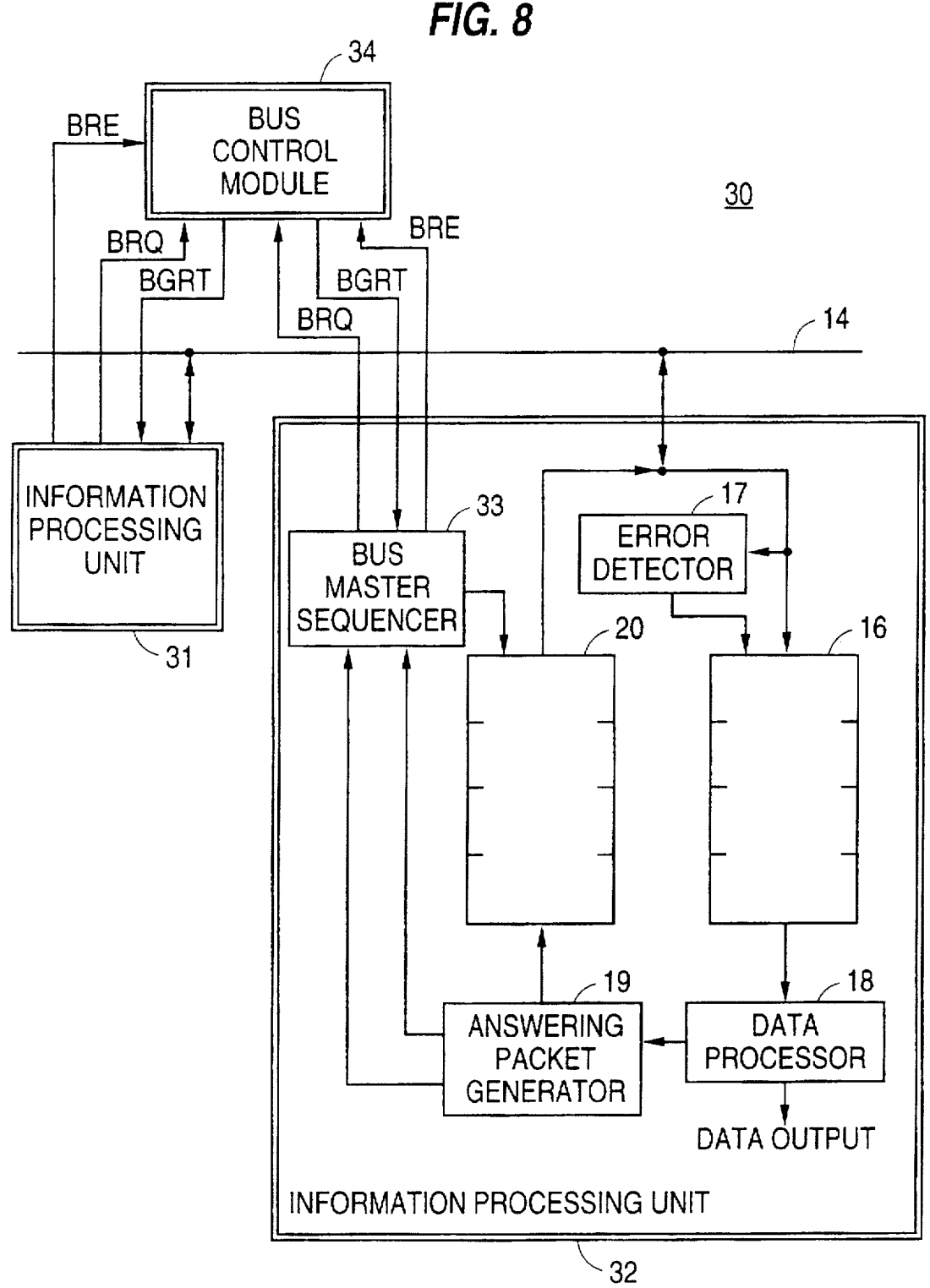
FIG. 8 is a block diagram of an information processing device according to a second embodiment of the present invention.

A description will now be given, with reference to FIG. 8, of an information processing device 30 according to a second embodiment of the present invention. In FIG. 8, parts that are the same as those shown in the previously described figures are given the same reference numbers. The second embodiment of the present invention differs from the first embodiment thereof in that the information processing device 30 has a bus master sequencer 33 and a bus control module 34 different from the bus master sequencer 21 and the bus control module 15. More particularly, the bus request for the error answering packet addressed to the bus control module 34 is generated by the bus master sequencer 33 separately from the bus request BRQ for the normality answering packet, and the bus control module 34 preferentially gives the permission of use of the packet bus 14 to the information processing unit in which the error packet is detected.

The information processing device 30 includes information processing units (modules) 31 and 32, which respectively function as a data requesting unit and a data requested unit in the following description. The bus master sequencer 33 of each of the units 31 and 32 sends the bus control module 34 the bus request BRQ based on the normality answering packet request or the error answering packet request from the answering packet generator 19. Further, the bus master sequencer 33 sends the bus control module 34 a bus request BRE for sending the error answering packet in response to the error answering packet request.

Figure 9:
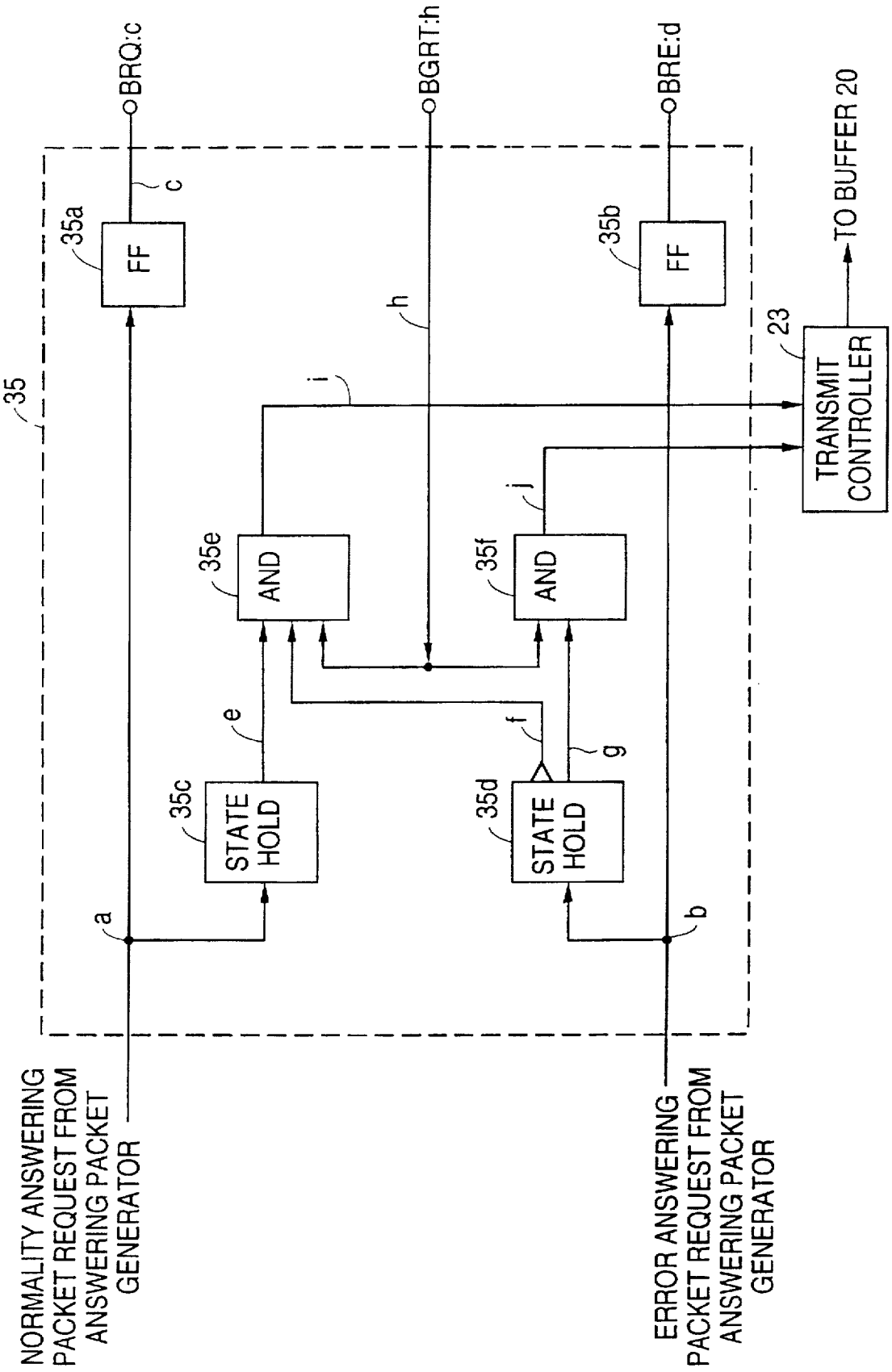
FIG. 9 is a block diagram of a bus master sequencer used in the second embodiment of the present invention.

FIG. 9 is a block diagram of the bus master sequencer 33. In FIG. 9, parts that are the same as those shown in FIG. 5 are given the same reference numbers, and a description thereof will be omitted.

The bus master sequencer 33 differs from that used in FIG. 5 in that the sequencer 33 generates, based on the states (high or low) of the normality answering packet request and the error answering packet request from the generator 19, the bus request signal BRQ used to send the normality answering packet and the bus request signal BRE used to send the error answering packet, and differs therefrom in that the sequencer 33 has a transmit operation starting signal generator 35 different from the generator 22 used in the first embodiment of the present invention. The generator 35 generates the normality/error answering packet transmit operation starting signals in response to the bus grant signal BGRT.

The transmit operation starting signal generator 35 is made up of flip-flops 35a and 35b, state hold circuits 35c and 35d, and AND gates 35e and 35f. The flip-flop 35a holds the state of the normality answering packet request until it is sent, and outputs the held state as the bus request signal BRQ. The flip-flop 35b holds the state of the error answering packet request until it is sent, and outputs the held state as the bus request signal BRE. The state hold circuit 35c holds the state of the normality answering packet request. The state hold circuit 35d holds the state of the error answering packet request, and outputs the non-inverted and inverted versions of the held signal. The AND gate 35e receives the output signal of the circuit 35c, the inverted version of the output signal of the circuit 35d and the bus grant signal BGRT, and performs an AND operation thereon. The output signal of the AND gate 35e is the normality answering packet transmit operation starting signal "i". The AND gate 35f receives the non-inverted output signal of the state hold circuit 35d and the bus grant signal BGRT, and performs an AND operation thereon. The output signal of the AND gate 35f forms the error response packet transmit operation starting signal "j".

Figure 10:
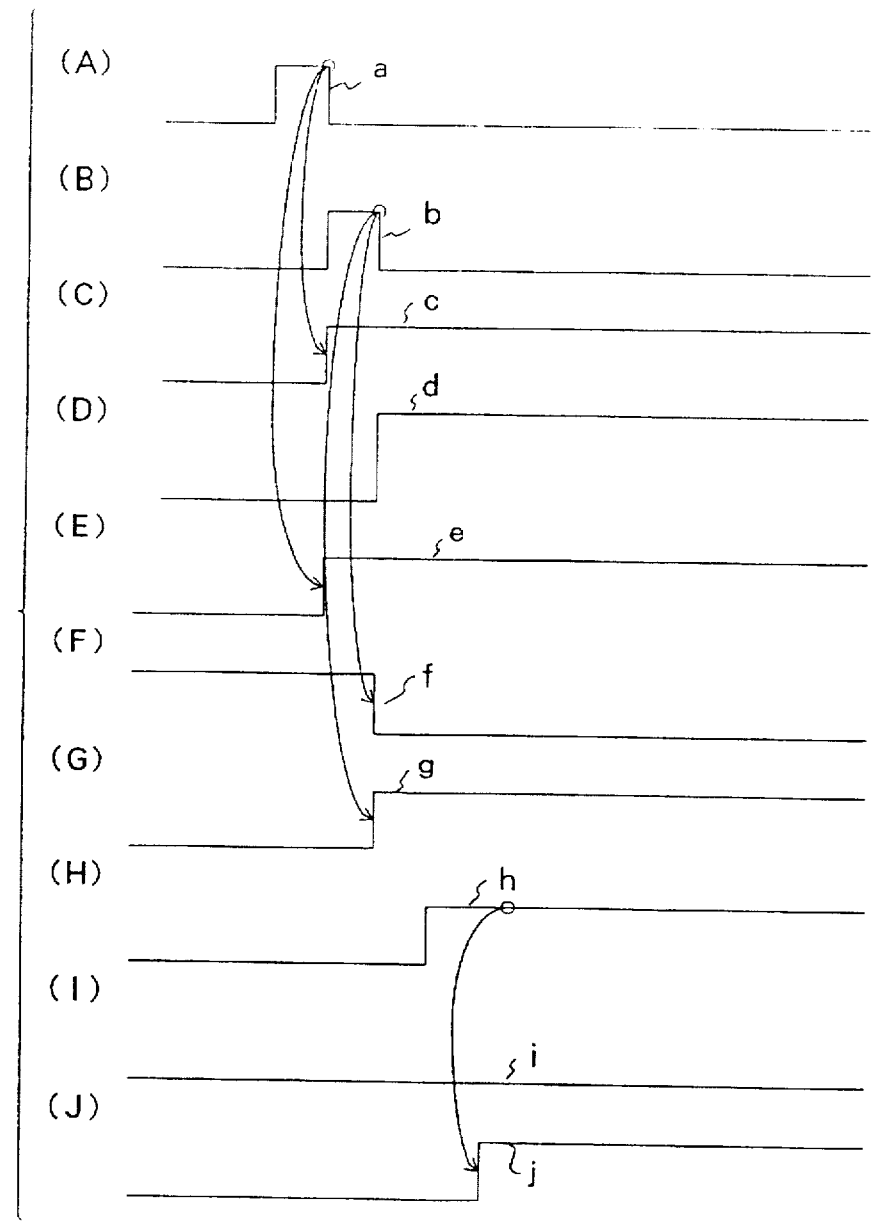
FIG. 10 is a time chart of an operation of the bus master sequencer shown in FIG. 9.

FIG. 10 is a time chart of the operation of the transmit operation starting signal generator 5. More particularly, part (A) of FIG. 10 shows the normality answering packet request "a", and part (B) shows the error answering packet request "b". Part (c) of FIG. 10 shows the bus request signal BRQ ("c"), and part (d) thereof shows the bus request signal BRE ("d"). Part (E) of FIG. 10 shows the output hold signal "e" of the state hold circuit 35c, and part (F) thereof shows the inverted version "f" of the output hold signal of the state hold circuit 35d. Part (G) of FIG. 10 shows the non-inverted version "g" of the output hold signal of the state hold circuit 35d, and part (H) thereof shows the bus grant signal BGRT ("h") from the bus control module 34. Part (I) of FIG. 10 shows the normality answering packet transmit operation starting signal "i", and part (J) thereof shows the error answering packet transmit operation starting signal "j".

As shown in parts (A) and (C) of FIG. 10, the bus request signal BRQ ("c") is being supplied to the bus control module 34 in response to the normality answering packet request "a". Even in this state, if the bus request BRE ("d") responsive to the error answering packet request "b" is supplied to the bus control module 34 before the bus grant signal BGRT ("h") shown in (H) of FIG. 10 responsive to the bus request signal BRQ ("c") is issued, the error answering packet transmit operation starting signal "j" shown in part (J) of FIG. 10 can be switched to the high level at the time when the bus grant signal BGRT ("h") is supplied.

In the above-mentioned way, the normality answering packet transmit operation starting signal "i" and the error answering packet transmit operation starting signal "j" can be obtained, and the error answering packet can be transmitted in advance of the normality answering packets. When the bus control module 34 receives the bus request signal BRE from any of the information processing units, it sends the bus grant signal BGRT to the information processing unit which issues the bus request BRE with priority over the bus requests BRQ from the other information processing units.

Figure 11:
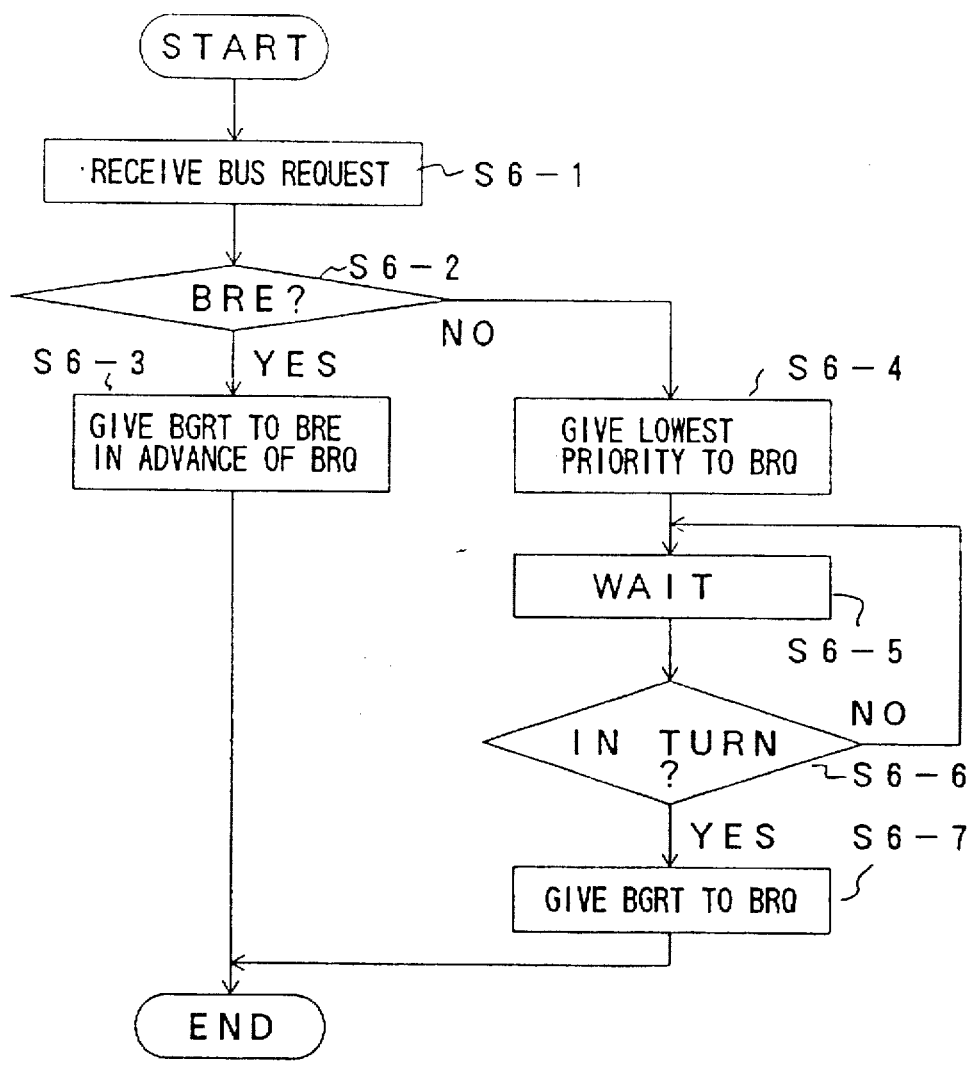
FIG. 11 is a flowchart of an operation of a bus control module used in the second embodiment of the present invention.

FIG. 11 is a flowchart of the operation of the bus control module 34. When the bus control module 34 receives the bus request at step S6-1, it determines whether the received bus request is the request BRQ or BRE at step S6-2. The bus control module 34 assigns priority over the other requests BRQ to the information processing unit which issues the bus request signal BRE, and sends the bus grant signal BGRT thereto at step S6-3. If the bus request received at step S6-1 is the bus request signal BRQ, the bus control module 34 assigns the lowest priority to the above request BRQ at step S6-4. When the above request signal BRQ is in its turn after the requests having higher priority are processed at steps S6-5 and S6-6, the bus control module 34 sends the bus grant signal BGRT to the information processing unit which issues the above bus request signal BRQ at step S6-7.

In the above-mentioned way, the bus grant signal BGRT can be sent to the information processing unit which issues the error answering packet in advance of the other requests BRQ. Hence, the above information processing unit can be informed of the occurrence of an error immediately.

Figure 12:
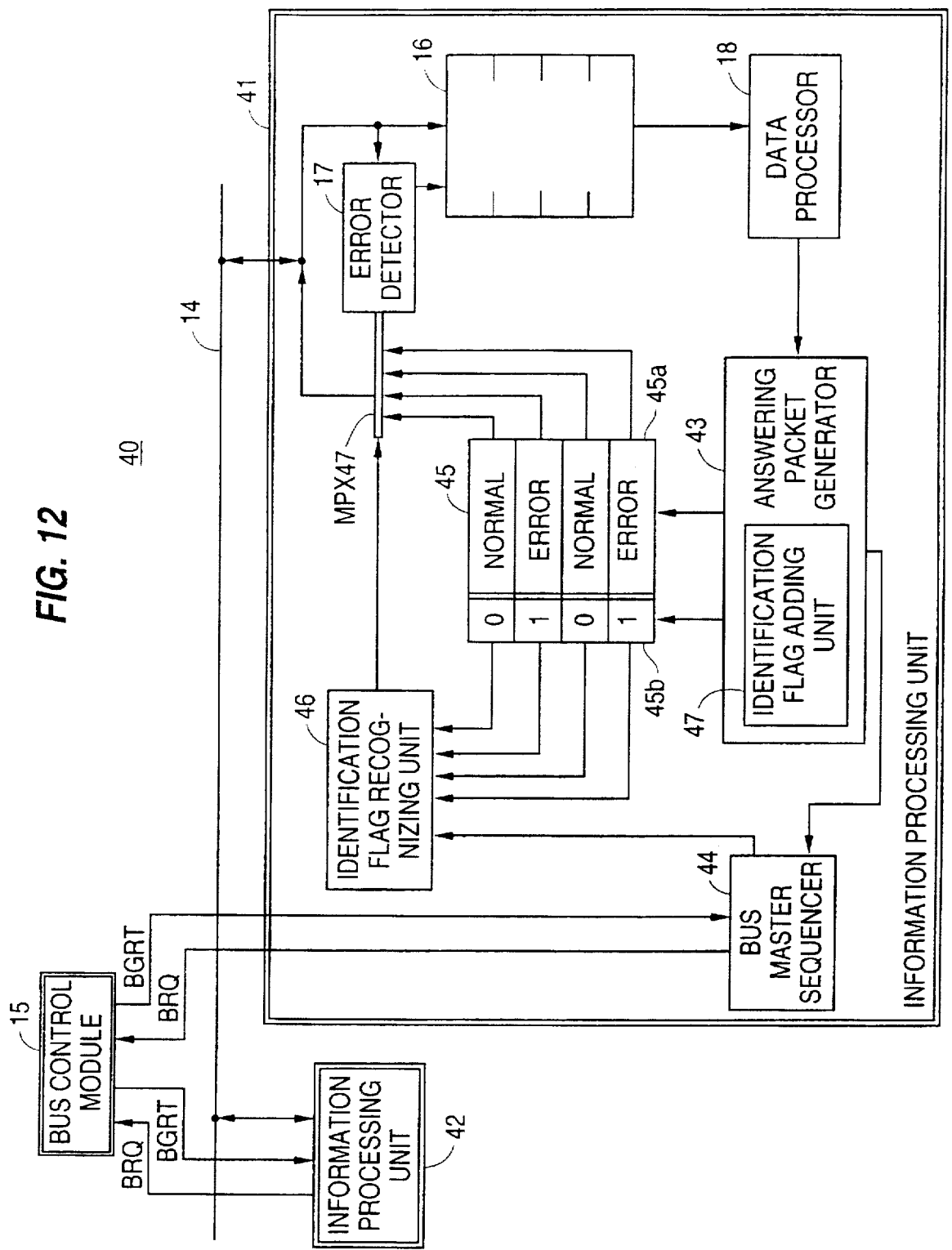
FIG. 12 is a block diagram of an information processing device according to a third embodiment of the present invention.

A description will now be given, with reference to FIG. 12, of an information processing unit 40 according to a third embodiment of the present invention. In FIG. 12, parts that are the same as those shown in the previously described figures are given the same reference numbers, and a description thereof will be omitted. According to the third embodiment of the present invention, an identification indicating whether the answering packet relates to normally received data or erroneously received data is stored in the answer buffer and the error answering packet can be read in advance of the normality answering packets by referring to the identification added to each of the packets stored in the answer buffer.

The information processing device shown in FIG. 12 includes information processing units (modules) 41 and 42, each of which includes an answering packet generator 43, a bus master sequencer 44, an answer buffer 45, an identification flag recognizing unit 46 and a multiplexer 47. These elements are different from the elements of the information processing device 11 shown in FIG. 1.

The answering packet generator 43 generates an answering packet based on the result of the process by the data processor 18. The answering packet generator 43 has a built-in identification flag adding unit 48, which sets the identification flag to "0" when the generated answering packet is normal, and sets the identification flag to "1" when the generated answering packet is erroneous. The identification flag is added to the answering packet.

The answer buffer 45 includes answering packet storage areas 45a and identification flags 45b. The answering packet storage areas 45a store the answering packets generated by the answering packet generator 43. The identification flags 45b store the identification flags indicating whether the respective answering packets are normal or erroneous.

The identification flag recognizing unit 46 is supplied with the identification flags from the answer buffer 45. In response to the transmit instruction supplied from the bus master sequencer 44, the unit 46 controls the multiplexer 47 by means of a selection signal so that the identification flag "1", that is, the error answering packet is selected. The multiplexer 47 is supplied with the answering packets stored in the answer buffer 45, and selects one of the answering packets in response to the selection signal supplied from the identification flag recognizing unit 46. The selected answering packet is then sent to the packet bus 14.

According to the third embodiment of the present invention, it is possible to easily discriminate between the error answering packet and the normality answering packets and to perform the transmit operation at a higher speed.

Figure 13:
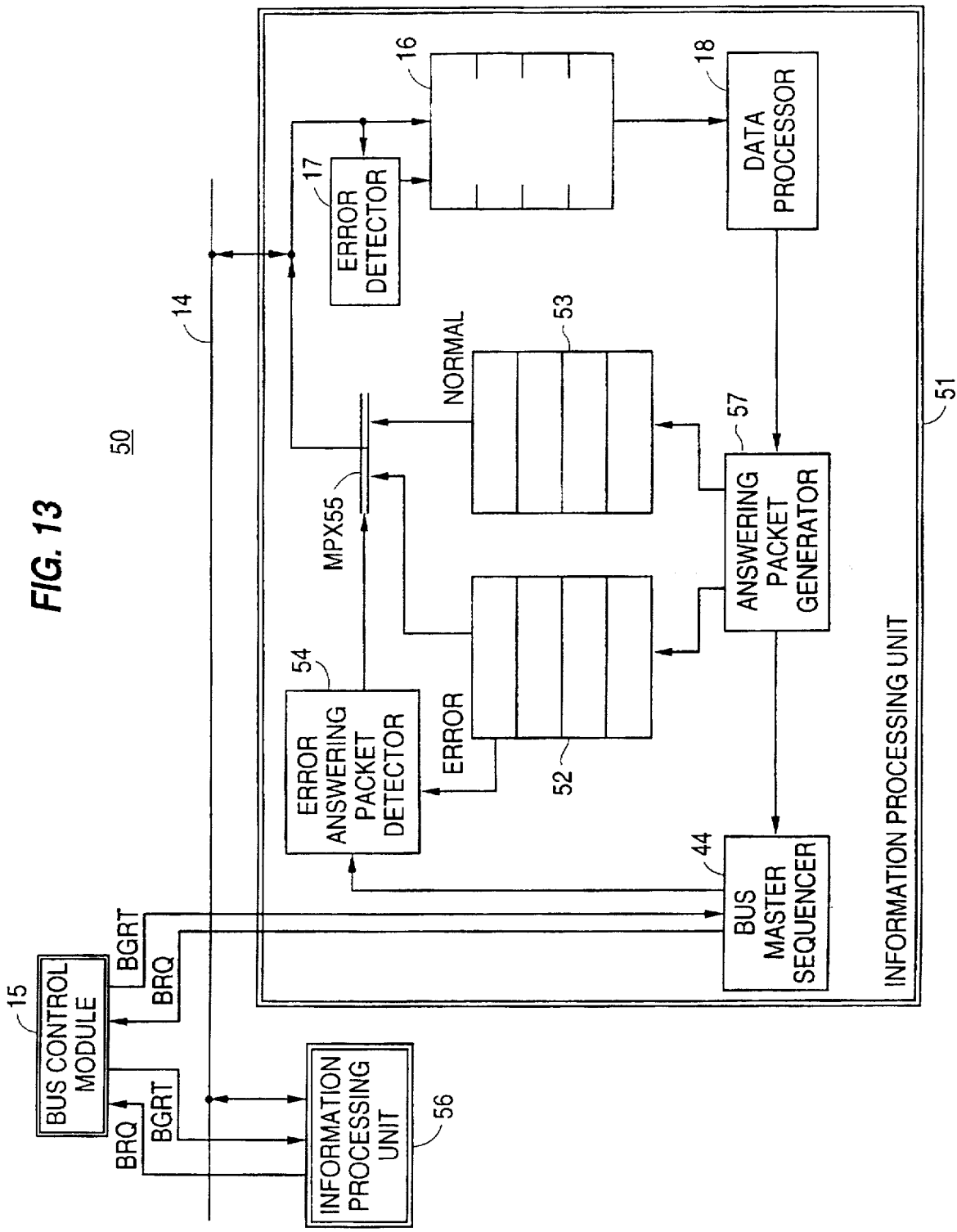
FIG. 13 is a block diagram of an information processing device according to a fourth embodiment of the present invention.

A description will now be given, with reference to FIG. 13, of an information processing device 50 according to a fourth embodiment of the present invention. In FIG. 13, parts that are the same as those shown in the previously described figures are given the same reference numbers. According to the fourth embodiment of the present invention, the answer buffer is divided into a normality answering buffer used to store the normality answering packets and an error answering buffer used to store the error answering packets. When the error answering packet is stored in the error answering buffer, the above packet is immediately sent in advance of the normality answering packets stored in the normality answering buffer.

The information processing device 50 shown in FIG. 13 includes information processing units (modules) 51 and 56, each of which includes an error answering buffer 52, a normality answering buffer 53, an error answering packet detector 54 and an answering packet generator 57 in addition to the aforementioned elements 16, 17 and 18. The answering packet generator 57 generates the error answering packet and the normality answering packet on the basis of the result of the process by the data processor 18. The error answering packet is stored in the buffer 52, and the normality answering packet is stored in the buffer 53.

The error answering packet detector 54 monitors the buffer 52, and controls the multiplexer 55 by sending the selection signal thereto in response to the transmission permission signal from the sequencer 44 if there is the error answering packet in the buffer 52, so that the buffer 52 is selected. Then, the error answering packet is read from the buffer 52 and is sent to the packet bus 14 via the multiplexer 55. Then, the detector 54 turns off the selection signal so that the buffer 53 is selected. The normality answering packets are read from the buffer 53 one by one in response to the respective transmission permission signals under the condition that there is no packet in the buffer 52.

Figure 14:
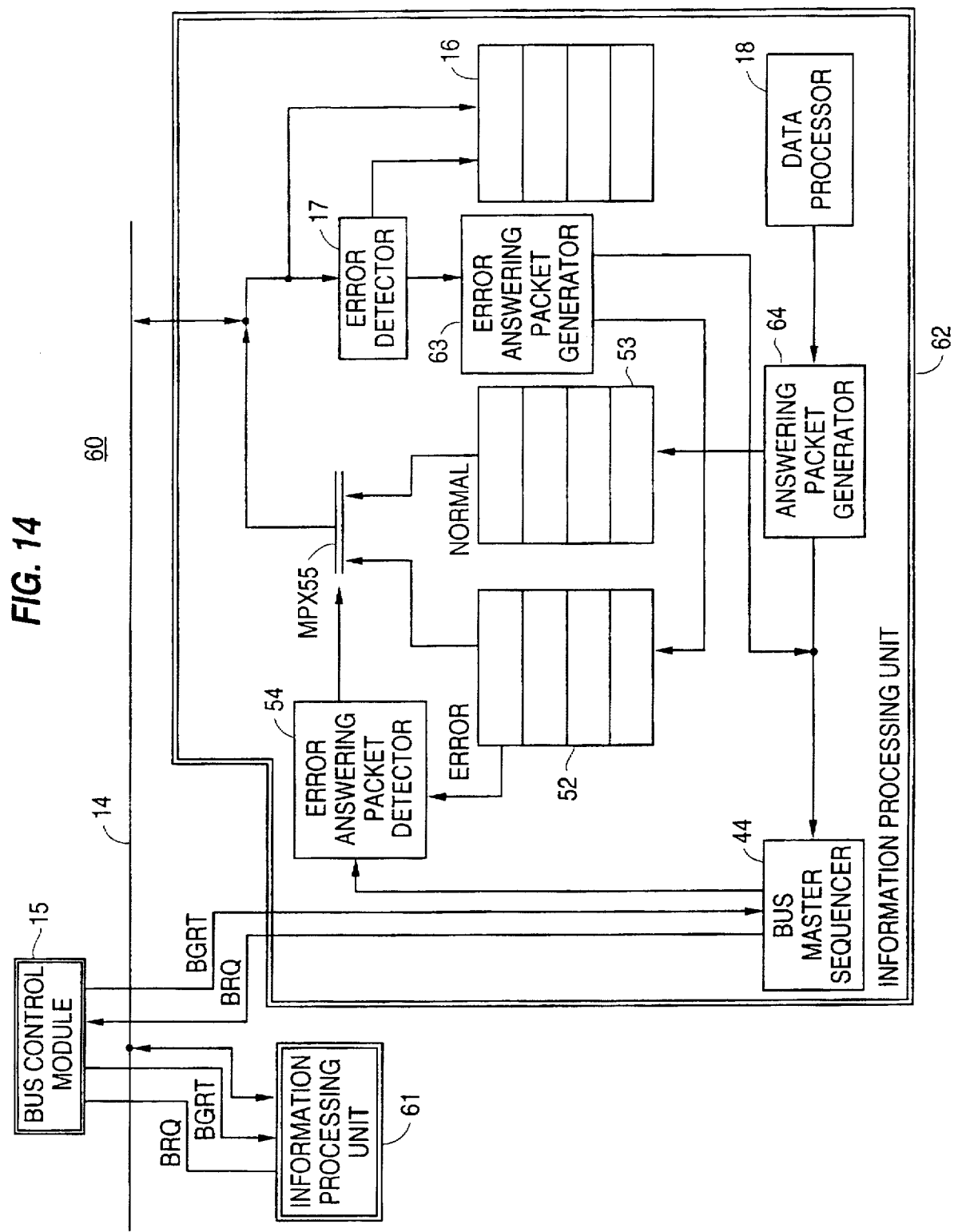
FIG. 14 is a block diagram of an information processing device according to a fifth embodiment of the present invention.

A description will now be given, with reference to FIG. 14, of an information processing device 60 according to a fifth embodiment of the present invention. In FIG. 14, parts that are the same as those shown in the previously described figures are given the same reference numbers. The fifth embodiment of the present invention is characterized in that the error answering packet is generated at the time when an error is detected in order to inform the corresponding data processing unit (module) of the occurrence of the error.

The information processing device 60 includes information processing units (modules) 61 and 62, each of which includes an error answering packet generator 63, and an answering packet generator 64. The generator 63 generates an error answering packet corresponding to the received packet having an error detected by the error detector 17. The generated error answering packet is stored in the buffer 52. The answering packet generator 64 generates only normality answering packets, which are stored in the buffer 53.

According to the fifth embodiment of the present invention, the error answering packet is generated immediately after the error detector 17 detects an error, so that the error answering packet can be sent to the bus immediately.

Figure 15:
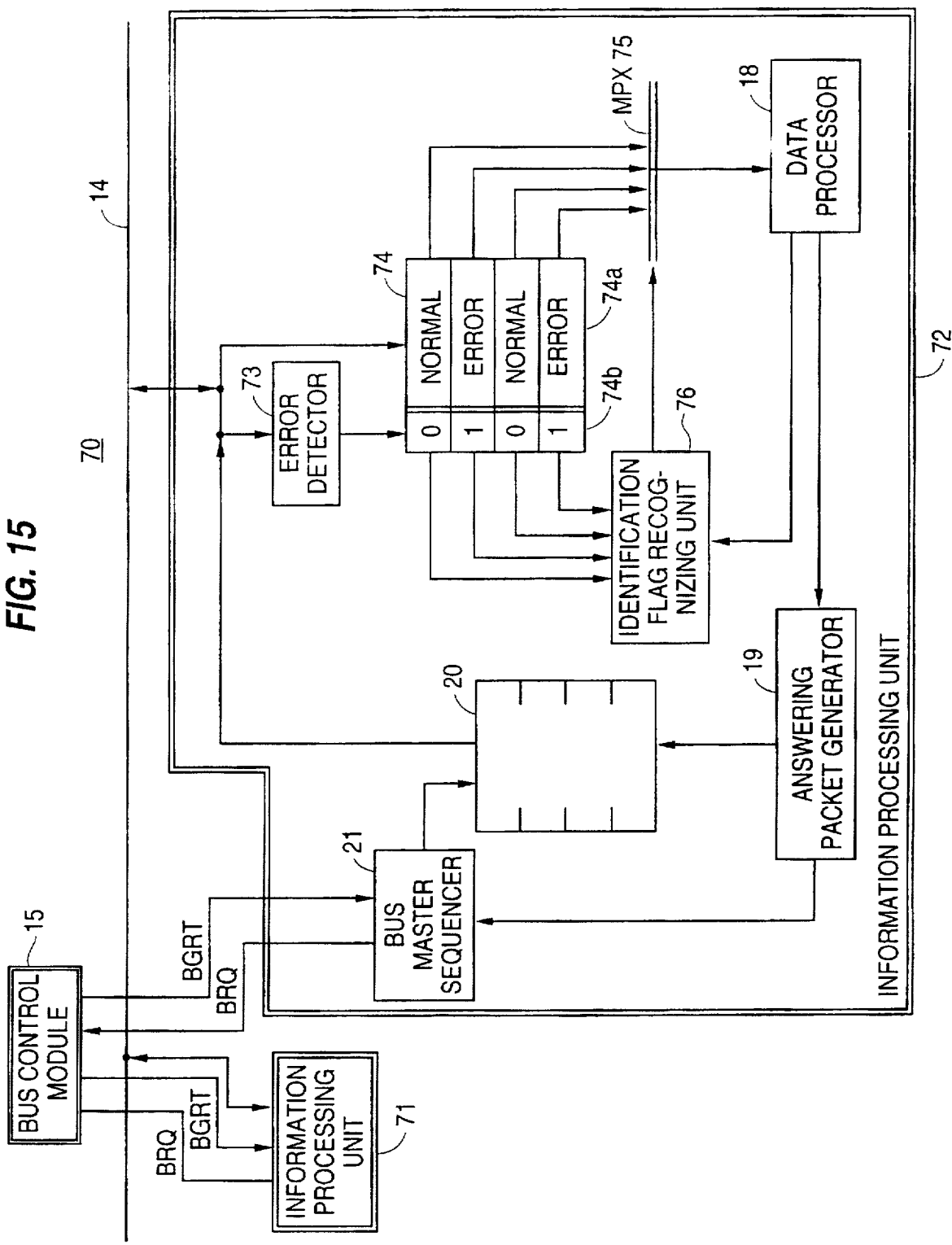
FIG. 15 is a block diagram of an information processing device according to a sixth embodiment of the present invention.

A description will now be given, with reference to FIG. 15, of an information processing device 70 according to a sixth embodiment of the present invention. In FIG. 15, parts that are the same as those shown in the previously described figures are given the same reference numbers. The information processing device 70 includes information processing units (modules) 71 and 72, each of which includes an error detector 73, a receive buffer 74, a multiplexer 75, and an identification flag recognizing unit 76.

The sixth embodiment of the present invention is characterized in that an identification flag indicating whether the corresponding received data (received packet) has an error is added to the received packet stored in the receive buffer 74. The received packets stored in the receive buffer 74 are sequentially read one by one in the order indicated by the identification flags so that the error answering packets are sent in advance of the normality answering packets.

More particularly, the error detector 73 performs a parity error check in order to detect an error contained in the received packet, and adds the identification flag to the received packet, the identification flag indicating whether the received packet has an error. The receive buffer 74 stores the received packets along with the identification flags. The multiplexer 75 selects one of the packets stored in the receive packet 74 under the control of the identification flag recognizing unit 76. The selected received packet is sent to the data processor 18. The unit 76 controls the multiplexer 75 on the basis of the identification flags stored in the receive buffer 74.

The error detector 73 inputs the packet received via the packet bus 14, and performs the parity check in order to determine whether the received packet has an error. When an error is detected, the error detector 73 adds the identification flag "1" to the received packet. When no error is detected, the error detector 73 adds the identification flag "0" to the received packet. The packet with the identification flag added is stored in the receive buffer 74.

The receive buffer 74 includes received packet storage areas 74a used to store the received packets, and identification flag storage areas 74b used to store the respective identification flags. The multiplexer 75 is supplied with the received packets stored in the receive buffer 74, and selects one of them in accordance with the selection signal. The selected received packet is sent to the data processor 18. The identification flag recognizing unit 76 supplies the selection signal to the multiplexer 75 each time the data processor 18 reads the received packet. The unit 76 selects the received packets so that the received packets with the flag "1" added thereto are preferentially selected over the received packets with the flag "0" added thereto. The received packets with the flag "1" added thereto are sequentially selected one by one in the order of input of the received packets to the receive buffer 14.

In the above way, the received packet having an error is supplied to the data processor 18 with priority over the received packets having no error, and the error answering packet is sent to the bus 14 immediately. Hence, a process for coping with the error can be immediately performed.

Figure 16:
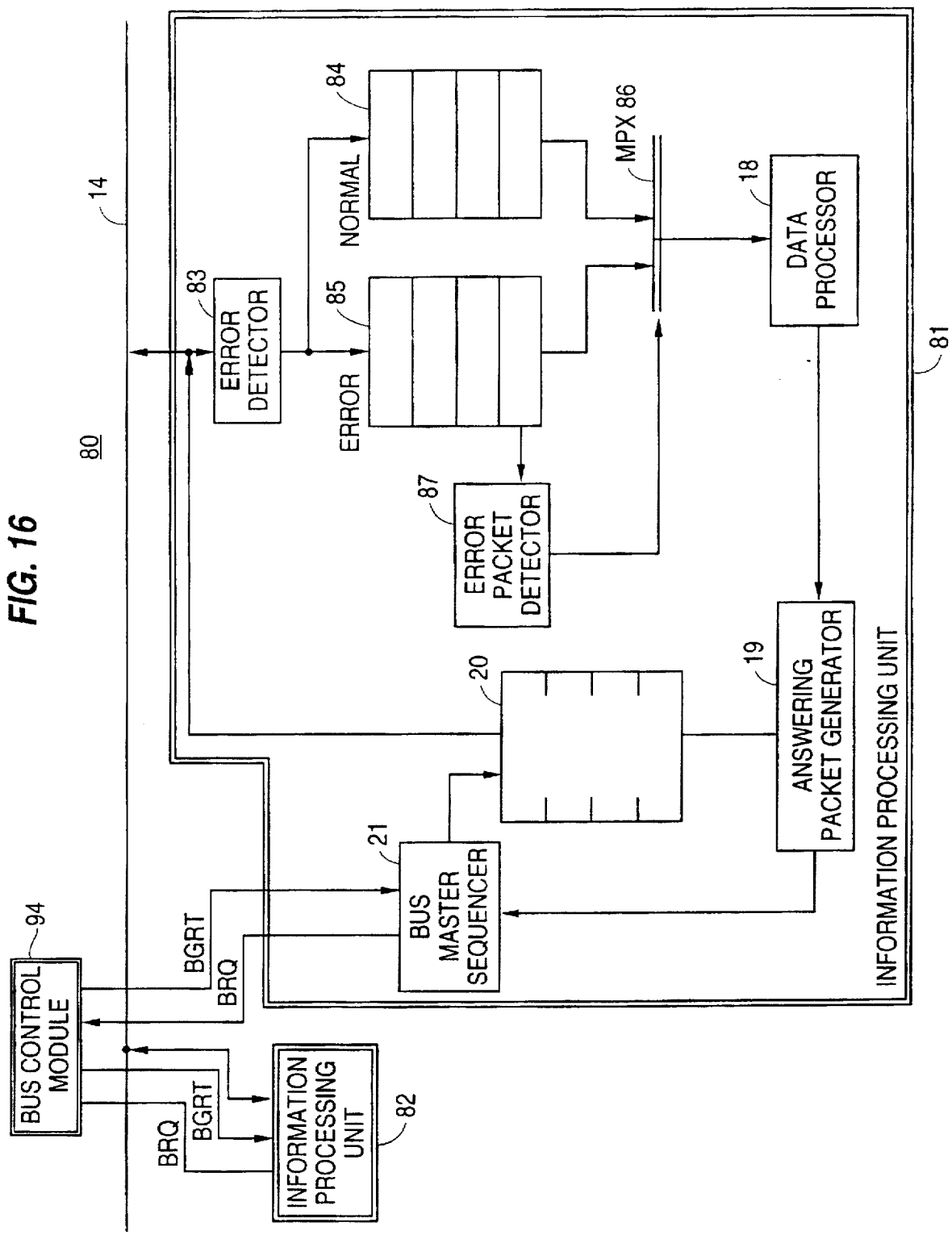
FIG. 16 is a block diagram of an information processing device according to a seventh embodiment of the present invention.

A description will now be given, with reference to FIG. 16, of an information processing device 80 according to a seventh embodiment of the present invention. In FIG. 16, parts that are the same as those shown in the previously described figures are given the same reference numbers.

The information processing device 80 includes information processing units (modules) 81 and 82, each of which includes an error detector 83, a normal receive buffer 84, an erroneous receive buffer 85, a multiplexer 86 and an error packet detector 87. The buffers 84 and 85 are provided separately. The buffer 85 has priority over the buffer 84 with respect to the process of the data processor 18.

The error detector 83 determines, by means of a parity check process for the received packet, whether an error is contained in the received packet. Under the control of the error detector 83, each received packet having no error is stored in the buffer 84, and each received packet having an error is stored in the buffer 85. The error packet detector 87 checks the buffer 85 and determines whether there is any packet (error packet) in the buffer 85. When a packet is stored in the buffer 85, the detector 87 sends a selection signal to the multiplexer 86 so that the oldest error packet is read from the buffer 85 and sent to the data processor 18. When the detector 87 detects no packet in the buffer 85, the selection signal controls the multiplexer 86 so that the buffer 84 is selected.

In the above way, when an error is detected in the received packet, the corresponding error answering packet is sent to the bus 14 immediately in advance of the other normal packets. Hence, a process for coping with the error can be immediately performed.

The present invention is not limited to the specifically disclosed embodiments, and variations and modifications may be made without departing from the scope of the present invention.

What is claimed is:

1. A first information processing unit which transfers and receives data to and from a second information processing unit via a bus provided therebetween, a data requested unit which is included in said first information processing unit sending an answering signal to a data requesting unit which is included in said second information processing unit, said first and second information processing units comprising:

error detecting means for detecting an error in received data;

answering signal generating means for generating an error answering signal with respect to received data having an error and a normality answering signal with respect to received data having no error; and information sending means for sending the error answering signal to the bus with priority over the normality answering signal, said information sending means including:
    memory means for storing at least one error answering signal and a normality answering signal; and
    control means for controlling the memory means so that said at least one error answering signal is read from the memory means and sent to the bus in advance of the normality answering signal stored in said memory means.

2. The first information processing unit which transfers and receives data to and from a second information processing unit by way of a bus provided therebetween as claimed in claim 1, wherein:

said memory means stores the error answering signal and the normality answering signal in the order of receipt thereof; and said control means controls the memory means so that the normality answering signal is read from the memory means in the order of receipt thereof when no error answering signal is stored in said memory means, and further if there is said at least one error answering signal in the memory means, said at least one error answering signal is sent to the bus in advance of the normality answering signal.

3. The first information processing unit which transfers and receives data to and from a second information processing unit by way of a bus provided therebetween as claimed in claim 1, wherein:

said memory means comprises a first memory which stores said normality answering signal and a second memory which stores said at least one error answering signal; and said control means controls said memory means so that if there is at least one error answering signal in the second memory, said at least one error answering signal is sent to the bus in advance of the normality answering signal.

4. The first information processing unit which transfers and receives data to and from a second information processing unit by way of a bus provided therebetween as claimed in claim 1, wherein:

said answering signal generating means comprises means for adding identification information to a respective set of received data, said identification information indicating whether said respective set of the received data has an error, said identification information being stored in said memory means together with the respective set of the received data; and said control means controls said memory means so that if there is the identification information that there is received data having an error, said at least one error answering signal is sent to the bus in advance of the normality answering signal.

5. The first information processing unit which transfers and receives data to and from a second information processing unit by way of a bus provided therebetween as claimed in claim 1, wherein:

each of said first and second information processing units comprises memory means for storing received data obtained via the bus; and said answering signal generating means comprises first means for generating said error answering signal with respect to received data having an error detected by said error detecting means, and second means for generating said normality answering signal with respect to received data having no error.

6. A first information processing unit which transfers and receives data to and from a second information processing unit by way of a bus provided therebetween, a data requested unit which is included in said first information processing unit sending an answering signal to a data requesting unit which is included in said second information processing unit, said first and second information processing units comprising:

error detecting means for detecting an error in received data;

answering signal generating means for generating an error answering signal with respect to received data having an error and a normality answering signal with respect to received data having no error; and information sending means for sending the error answering signal to the bus with priority over the normality answering signal;

each of said first and second information processing units including memory means for storing received data obtained via the bus;

said error detecting means including means for adding identification information to a respective set of the received data, said identification information discriminating received data having an error from received data having no error, said identification information being stored in the memory means together with the respective set of the received data;

said answering signal generating means including means for generating, while referring to said identification information in the order of reading the received data, the error answering signal with respect to the identification information indicating an error and the normality answering signal with respect to the identification information indicating no error; and said information sending means including means for reading, from the memory means, the received data to which the identification information indicating an error is added in advance of the received data to which the identification information indicating no error is added, and for supplying read data from said memory means to said answering signal generating means, so that the error answering signal is sent to the bus in advance of the normality answering signal, which is then sent to the bus in the order of generation thereof.

7. A first information processing unit which transfers and receives data to and from a second information processing unit by way of a bus provided therebetween, a data requested unit which is included in said first information processing units sending an answering signal to a data requesting unit which is included in said second information processing unit, said first and second information processing units comprising:

error detecting means for detecting an error in received data;

answering signal generating means for generating an error answering signal with respect to received data having an error and a normality answering signal with respect to received data having no error; and information sending means for sending the error answering signal to the bus with priority over the normality answering signal;

each of said first and second information processing units including a first memory which stores received data having an error detected by said error detecting means, and a second memory which stores received data having no error;

said answering signal generating means generating answering signals with respect to the received data read from the first and second memories in the order of reading the received data therefrom; and said information sending means including means for reading the received data from the first memory in advance of the received data stored in the second memory, and for supplying read data from said first and second memories to said answering signal generating means, so that the error answering signal is sent to the bus in advance of the normality answering signal, which is then sent to the bus in the order of generation thereof.

8. A first information processing unit which transfers and receives data to and from a second information processing unit via a bus provided therebetween, a data requested unit which is included in said first information processing unit sending an answering signal to a data requesting unit which is included in said second information processing unit, said first and second information processing units comprising:

error detecting means for detecting an error in received data;

answering signal generating means for generating an error answering signal with respect to received data having an error and a plurality of normality answering signals with respect to received data having no error; and information sending means for sending the error answering signal to the bus with priority over the normality answering signals, said information sending means including:

memory means for storing at least one error answering signal and the normality answering signals; and control means for controlling the memory means so that said at least one error answering signal is read from the memory means and sent to the bus in advance of the normality answering signals stored in said memory means.

9. The first information processing unit which transfers and receives data to and from a second information processing unit by way of a bus provided therebetween as claimed in claim 8, wherein:

said memory means stores the error answering signal and the normality answering signals in the order of receipt thereof; and said control means controls the memory means so that the normality answering signals are sequentially read from the memory means in the order of receipt thereof when no error answering signal is stored in said memory means, and further if there is said at least one error answering signal in the memory means, said at least one error answering signal is sent to the bus in advance of the normality answering signals.

10. The first information processing unit which transfers and receives data to and from a second information processing unit by way of a bus provided therebetween as claimed in claim 8, wherein:

said memory means comprises a first memory which stores said normality answering signals and a second memory which stores said at least one error answering signal; and said control means controls said memory means so that if there is at least one error answering signal in the second memory, said at least one error answering signal is sent to the bus in advance of the normality answering signals.

11. The first information processing unit which transfers and receives data to and from a second information processing unit by way of a bus provided therebetween as claimed in claim 8, wherein:

said answering signal generating means comprises means for adding identification information to a respective set of received data, said identification information indicating whether said respective set of the received data has an error, said identification information being stored in said memory means together with the respective set of the received data; and said control means controls said memory means so that if there is the identification information that there is received data having an error, said at least one error answering signal is sent to the bus in advance of the normality answering signals.

12. The first information processing unit which transfers and receives data to and from a second information processing unit by way of a bus provided therebetween as claimed in claim 8, wherein:

each of said first and second information processing units comprises memory means for storing received data obtained via the bus; and said answering signal generating means comprises first means for generating said error answering signal with respect to received data having an error detected by said error detecting means, and second means for generating said normality answering signals with respect to received data having no error.

13. A first information processing unit which transfers and receives data to and from a second information processing unit by way of a bus provided therebetween, a data requested unit which is included in said first information processing unit sending an answering signal to a data requesting unit which is included in said second information processing unit, said first and second information processing units comprising:

error detecting means for detecting an error in received data;

answering signal generating means for generating an error answering signal with respect to received data having an error and a plurality of normality answering signals with respect to received data having no error; and information sending means for sending the error answering signal to the bus with priority over the normality answering signals;

each of said first and second information processing units including memory means for storing received data obtained via the bus;

said error detecting means including means for adding identification information to a respective set of the received data, said identification information discriminating received data having an error from received data having no error, said identification information being stored in the memory means together with the respective set of the received data;

said answering signal generating means including means for generating, while referring to said identification information in the order of reading the received data, the error answering signal with respect to the identification information indicating an error and the normality answering signals with respect to the identification information indicating no error; and said information sending means including means for reading, from the memory means, the received data to which the identification information indicating an error is added in advance of the received data to which the identification information indicating no error is added, and for supplying read data from said memory means to said answering signal generating means, so that the error answering signal is sent to the bus in advance of the normality answering signals, which are then sent to the bus in the order of generation thereof.

* * * * *